US012794298B2

(12) United States Patent
Nakamura et al.

(10) Patent No.: US 12,794,298 B2
(45) Date of Patent: Nov. 10, 2026

(54) MOTOR AND ELECTRIC TOOL

(71) Applicant: NEXRA Field Works Co., Ltd., Osaka (JP)

(72) Inventors: Akito Nakamura, Osaka (JP); Kota Kitamura, Mie (JP); Kotaro Momoeda, Osaka (JP)

(73) Assignee: NEXRA FIELD WORKS CO., LTD., Osaka (JP)

( * ) Notice: Subject to any disclaimer, the term of this patent is extended or adjusted under 35 U.S.C. 154(b) by 137 days.

(21) Appl. No.: 18/546,737

(22) PCT Filed: Jan. 26, 2022

(86) PCT No.: PCT/JP2022/002912
§ 371 (c)(1),
(2) Date: Aug. 16, 2023

(87) PCT Pub. No.: WO2022/181167
PCT Pub. Date: Sep. 1, 2022

(65) Prior Publication Data

US 2024/0235306 A1 Jul. 11, 2024

(30) Foreign Application Priority Data

Feb. 26, 2021 (JP) ................................. 2021-030831

(51) Int. Cl.
*H02K 3/28* (2006.01)
*H02K 3/52* (2006.01)
(Continued)

(52) U.S. Cl.
CPC ............... *H02K 3/28* (2013.01); *H02K 3/522* (2013.01); *H02K 7/145* (2013.01); *H02K 21/16* (2013.01); *H02K 2203/12* (2013.01)

(58) Field of Classification Search
CPC .. H02K 3/28; H02K 3/38; H02K 3/50; H02K 3/52; H02K 3/522; H02K 15/30; H02K 15/33
(Continued)

(56) References Cited

U.S. PATENT DOCUMENTS 9,608,491 B2 3/2017 Kameyama et al.
11,784,528 B2 * 10/2023 Suzuki .................... H02K 3/28 310/195
(Continued)

FOREIGN PATENT DOCUMENTS

CN 109217503 A 1/2019
CN 112311121 A 2/2021
(Continued)

OTHER PUBLICATIONS

DE-102020114065-A1 machine translation (Year: 2020).*
(Continued)

*Primary Examiner* — Oluseye Iwarere
*Assistant Examiner* — Minki Chang
(74) *Attorney, Agent, or Firm* — Rimon P.C.

(57) ABSTRACT

A motor includes: a stator including a stator core and stator wiring; and a rotor. The stator core includes a teeth core and a yoke core. The teeth core includes: an inner cylindrical portion; and a plurality of teeth, each of which includes a body portion protruding outward from the inner cylindrical portion along a radius of the inner cylindrical portion. The yoke core has a cylindrical shape and is mounted onto the plurality of teeth to surround the plurality of teeth. The stator wiring includes: a coil wire wound around the body portion; and transition wiring electrically connecting together a plurality of the coil wires respectively wound around a plurality
(Continued)

of the body portions. The transition wiring is provided in a region located inside the body portion along a radius of the body portion.

2 Claims, 9 Drawing Sheets

(51) Int. Cl.
*H02K 7/14* (2006.01)
*H02K 21/16* (2006.01)

(58) Field of Classification Search
USPC .......................................................... 310/208
See application file for complete search history.

(56) References Cited

U.S. PATENT DOCUMENTS

| | | | |
|---|---|---|---|
| 2013/0200742 A1 | 8/2013 | Seki et al. | |
| 2014/0346916 A1 | 11/2014 | Sakon et al. | |
| 2019/0036391 A1 * | 1/2019 | Brohm | H02K 3/522 |
| 2020/0287436 A1 | 9/2020 | Suzuki | |
| 2021/0028666 A1 | 1/2021 | Feng et al. | |

FOREIGN PATENT DOCUMENTS

| | | | | |
|---|---|---|---|---|
| DE | 102020114065 | A1 * | 1/2021 | H02K 15/095 |
| EP | 2207254 | A2 | 7/2010 | |
| JP | H11-032463 | A | 2/1999 | |
| JP | 2010-142075 | A | 6/2010 | |
| JP | 2010-166643 | A | 7/2010 | |
| JP | 2013-162726 | A | 8/2013 | |
| WO | 2014/108942 | A1 | 7/2014 | |

OTHER PUBLICATIONS

International Search Report dated Mar. 15, 2022 issued in International Patent Application No. PCT/JP2022/002912, with English translation.
Extended European Search Report dated Jul. 26, 2024 issued in the corresponding European Patent Application No. 22759209.4.
Chinese Office Action dated Jul. 8, 2026 issued in the corresponding Chinese Patent Application No. 202280011464.5, with English machine translation.
European Office Action dated Aug. 11, 2026 issued in the corresponding European Patent Application No. 22759209.4.

* cited by examiner

MOTOR AND ELECTRIC TOOL

CROSS-REFERENCE OF RELATED APPLICATIONS

This application is the U.S. National Phase under 35 U.S.C. § 371 of International Patent Application No. PCT/JP2022/002912, filed on Jan. 26, 2022, which in turn claims the benefit of Japanese Patent Application No. 2021-030831, filed on Feb. 26, 2021, the entire disclosures of which Applications are incorporated by reference herein.

TECHNICAL FIELD

The present disclosure generally relates to a motor and an electric tool, and more particularly relates to a motor including a stator core and a rotor and an electric tool including such a motor.

BACKGROUND ART

Patent Literature 1 discloses a disk drive motor in which both end edges of an annular yoke is caulked to be hermetically sealed along the entire circumference thereof.

However, Patent Literature 1 fails to specifically teach how to arrange the coil in the disk drive motor, thus often making the electric wire bulky and causing an increase in Joule loss.

CITATION LIST

Patent Literature

Patent Literature 1: JP H11-32463 A

SUMMARY OF INVENTION

An object of the present disclosure is to provide a motor and an electric tool, both of which make it easier to cut down the stator wiring and reduce the Joule loss.

A motor according to an aspect of the present disclosure includes: a stator including a stator core and stator wiring; and a rotor including magnets and rotating with respect to the stator core. The stator core includes a teeth core and a yoke core. The teeth core includes: an inner cylindrical portion which has a cylindrical shape and in which the rotor is disposed; and a plurality of teeth, each of which includes a body portion protruding outward from the inner cylindrical portion along a radius of the inner cylindrical portion. The yoke core has a cylindrical shape and is mounted onto the plurality of teeth to surround the plurality of teeth. The stator wiring includes: a coil wire wound around the body portion; and transition wiring electrically connecting together a plurality of the coil wires respectively wound around a plurality of the body portions. The transition wiring is provided in a region that is located inside the body portion along a radius of the body portion.

An electric tool according to another aspect of the present disclosure includes the motor described above.

DESCRIPTION OF EMBODIMENTS

An electric tool according to an embodiment and a motor provided for the electric tool will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are all schematic representations. Thus, the ratio of the dimensions (including thicknesses) of respective constituent elements illustrated on the drawings does not always reflect their actual dimensional ratio.

(1) Electric Tool

Figure 1:
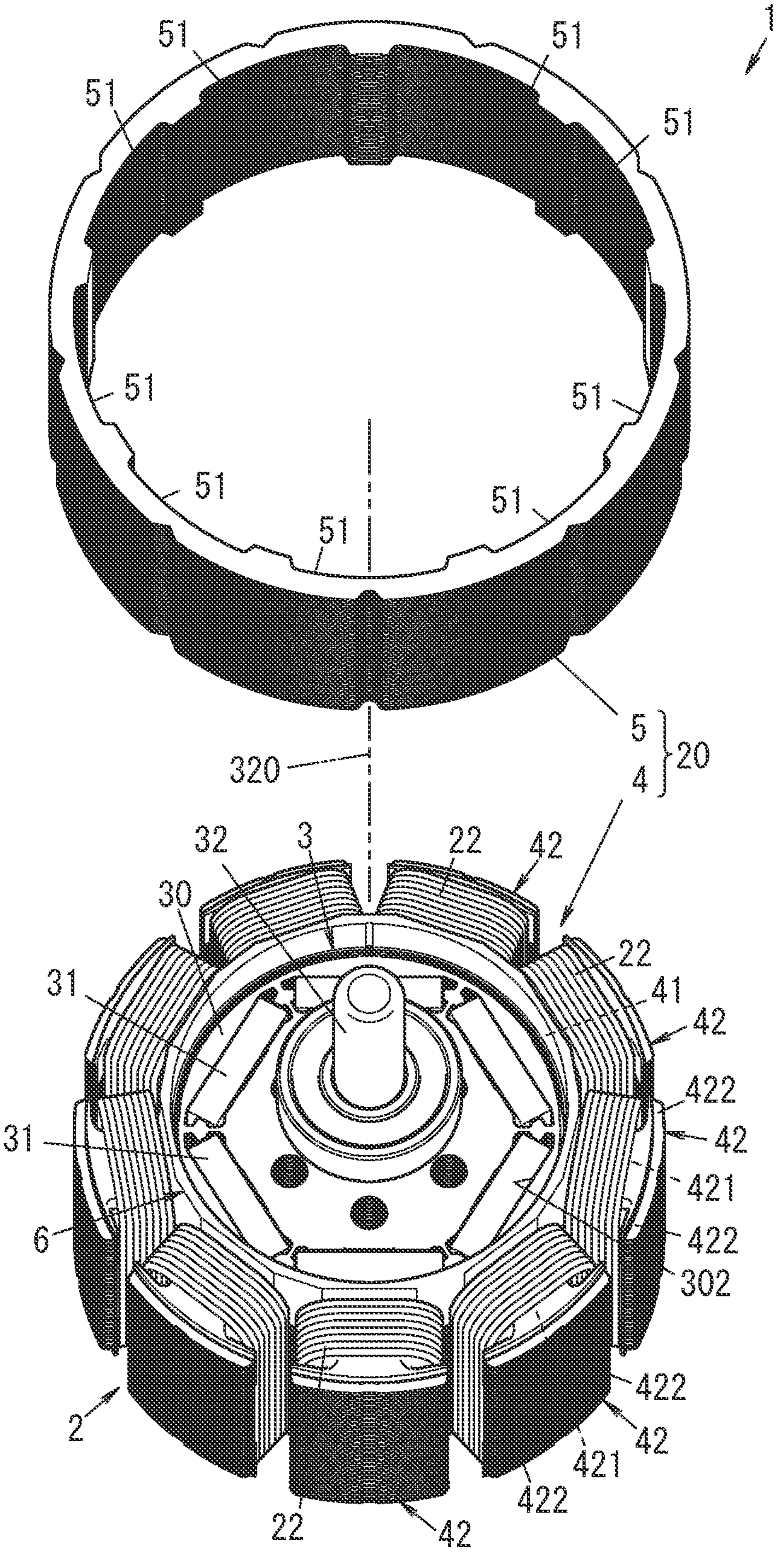
FIG. 1 is an exploded view of a main part of a motor according to an exemplary embodiment.
Figure 2:
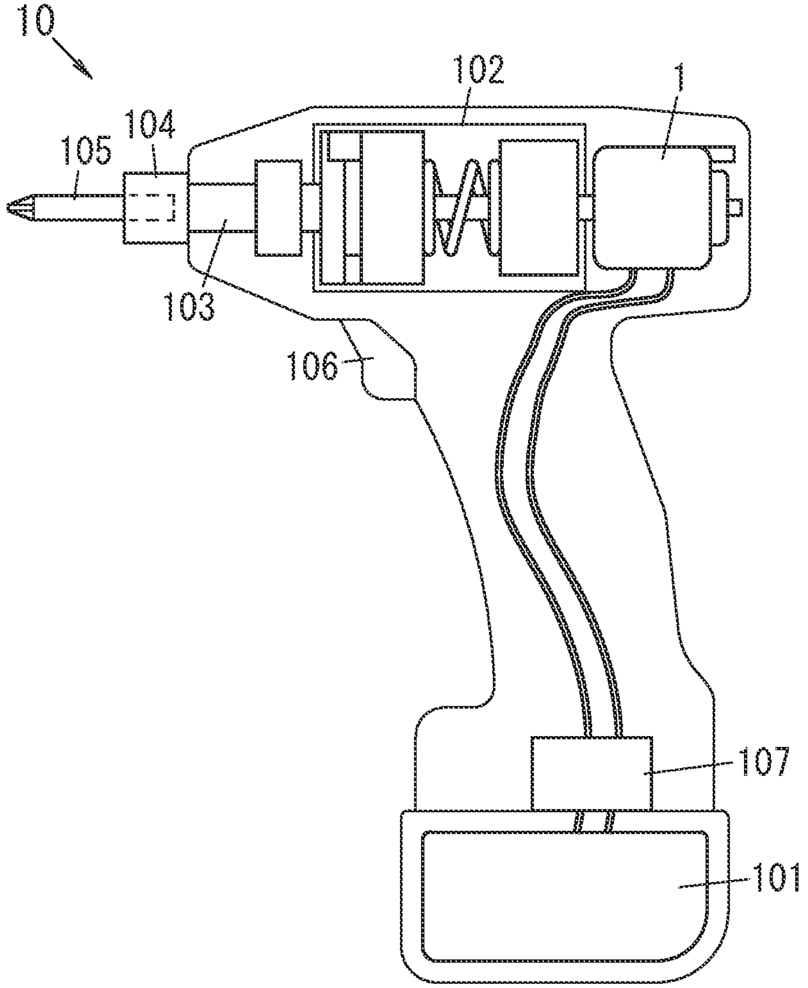
FIG. 2 is a schematic representation of an electric tool including the motor.

As shown in FIGS. 1 and 2, the electric tool 10 includes a motor 1. As shown in FIG. 2, the electric tool 10 further includes a power supply 101, a driving force transmission unit 102, an output unit 103, a chuck 104, a tip tool 105, a trigger volume 106, and a control circuit 107. The electric tool 10 is a tool for driving the tip tool 105 with the driving force of the motor 1.

The motor 1 is a drive source for driving the tip tool 105. The motor 1 may be, for example, a brushless motor. The power supply 101 is a DC power supply for supplying a current to drive the motor 1. The power supply 101 may include, for example, a single secondary battery or a plurality of secondary batteries. The driving force transmission unit 102 regulates the output (driving force) of the motor 1 and supplies the regulated driving force to the output unit 103. The output unit 103 is a part to be driven (in rotation, for example) with the driving force supplied from the driving force transmission unit 102. The chuck 104 is a part fixed to the output unit 103 which allows the tip tool 105 to be attached thereto removably. Examples of the tip tool 105 (also called a "bit") include screwdrivers, sockets, and drills. One of those various types of tip tools 105 is selected depending on the intended use and attached for use to the chuck 104.

The trigger volume 106 is an operating member for accepting a command for controlling the rotation of the motor 1. The motor 1 may be turned ON and OFF by performing the operation of pulling the trigger volume 106. In addition, adjusting the manipulative variable of the operation of pulling the trigger volume 106 allows the rotational velocity of the output unit 103, i.e., the rotational velocity of the motor 1, to be controlled. The control circuit 107 either starts or stop rotating the motor 1 in accordance with the command entered through the trigger volume 106 and also controls the rotational velocity of the motor 1. In this electric tool 10, the tip tool 105 is attached to the chuck 104. Then, the rotational velocity of the motor 1 is controlled by operating the trigger volume 106, thereby controlling the rotational velocity of the tip tool 105.

Note that the electric tool 10 according to this embodiment includes the chuck 104, thus making the tip tool 105 replaceable depending on the intended use. However, the tip tool 105 does not have to be replaceable. Alternatively, the electric tool 10 may also be designed to allow the user to use only a particular type of tip tool 105.

(2) Motor

Next, a configuration for the motor 1 will be described with reference to FIG. 1 and other drawings. The motor 1 includes a stator 2 and a rotor 3. The rotor 3 has an output shaft 32. The stator 2 includes a stator core 20 and stator wiring 21. The rotor 3 rotates around a center axis 320 of the output shaft 32 with respect to the stator 2. Specifically, the magnetic flux generated from the plurality of (e.g., nine in the example illustrated in FIG. 1) coil wires 22 wound around the stator core 20 produces electromagnetic force that causes the rotor 3 to rotate. The motor 1 transmits the rotational force (driving force) of the rotor 3 from the output shaft 32 to the driving force transmission unit 102 (refer to FIG. 2).

The stator core 20 includes a teeth core 4 and a yoke core 5. The yoke core 5 is mounted onto the teeth core 4. The teeth core 4 includes an inner cylindrical portion 41 having a circular cylindrical shape and a plurality of (e.g., nine in the example illustrated in FIG. 1) teeth 42. Inside the inner cylindrical portion 41, the rotor 3 is disposed. Each of the plurality of teeth 42 includes a body portion 421 and two tip pieces 422. The body portion 421 protrudes outward from the inner cylindrical portion 41 along the radius of the inner cylindrical portion 41. In this embodiment, the inner cylindrical portion 41 includes a plurality of (e.g., nine in the example illustrated in FIG. 1) body portions 421, which are arranged at intervals along the circumference of the inner cylindrical portion 41.

The two tip pieces 422 extend, from a tip part of the body portion 421, in a direction intersecting with a direction in which the body portion 421 protrudes. Around the body portion 421, the coil wire 22 is wound via an insulator 6 (refer to FIG. 3) to be described later.

The two tip pieces 422 are provided as a stopper for reducing the chances of the coil wire 22 coming off the body portion 421. Specifically, having the coil wire 22 caught in the two tip pieces 422 while the coil wire 22 is moving toward a tip part of the body portion 421 reduces the chances of the coil wire 22 coming off.

The rotor 3 includes a rotor core 30 having a circular cylindrical shape, a plurality of (e.g., six in the example illustrated in FIG. 1) permanent magnets 31, and the output shaft 32. The output shaft 32 is held inside the rotor core 30. The plurality of permanent magnets 31 are arranged to form a polygonal (e.g., hexagonal) pattern.

Figure 3:
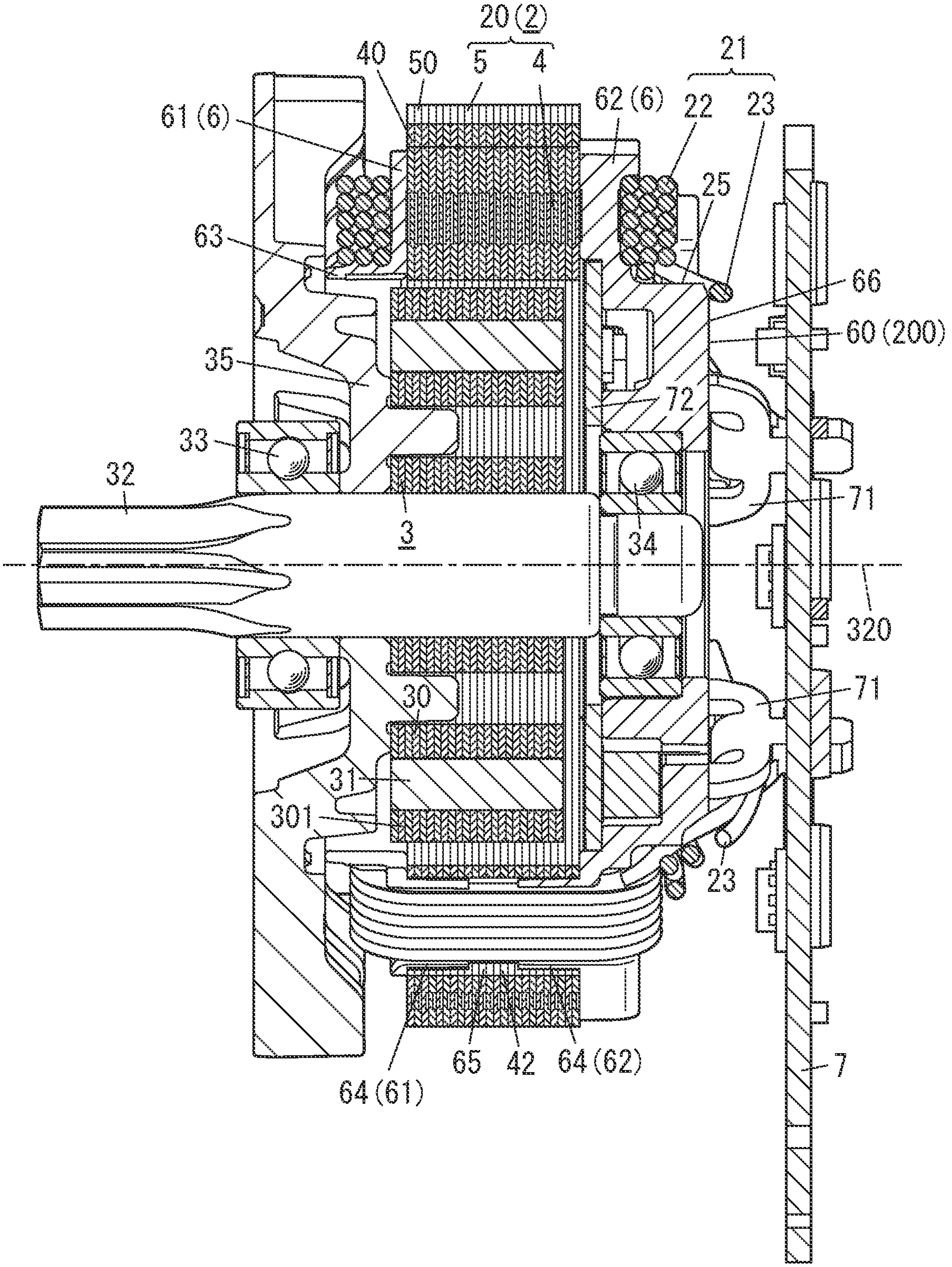
FIG. 3 is a cross-sectional view of the motor.
Figure 4:
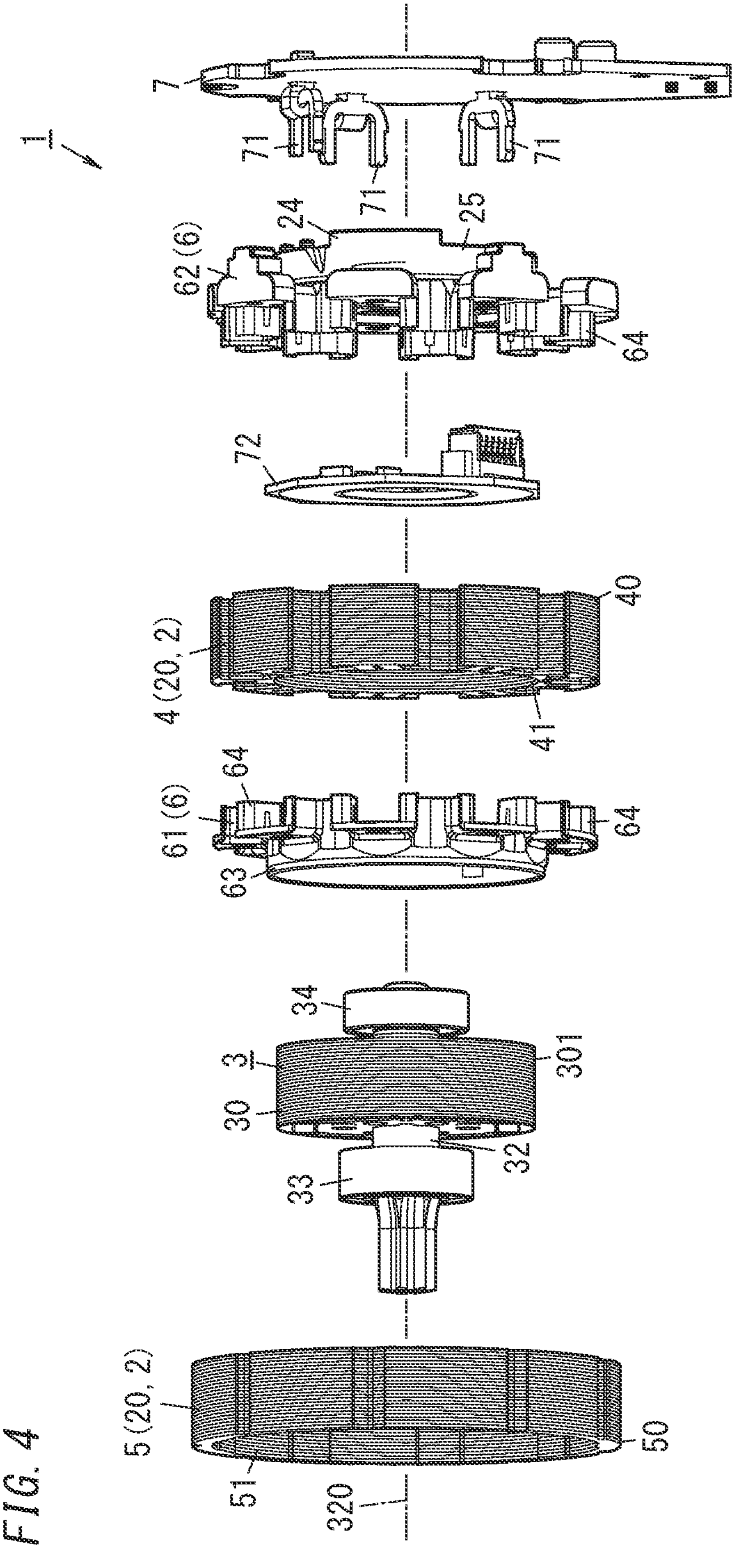
FIG. 4 is an exploded view of the motor (except its base)

Next, the configuration of the stator core 20 will be described in further detail. As shown in FIGS. 3 and 4, the teeth core 4 of the stator core 20 includes a plurality of steel sheets 40. The teeth core 4 is formed by stacking the plurality of steel sheets 40 one on top of another in the thickness direction. Each of the steel sheets 40 is made of a magnetic material. Each of the steel sheets 40 may be configured as, for example, a silicon steel sheet.

Figure 5A:
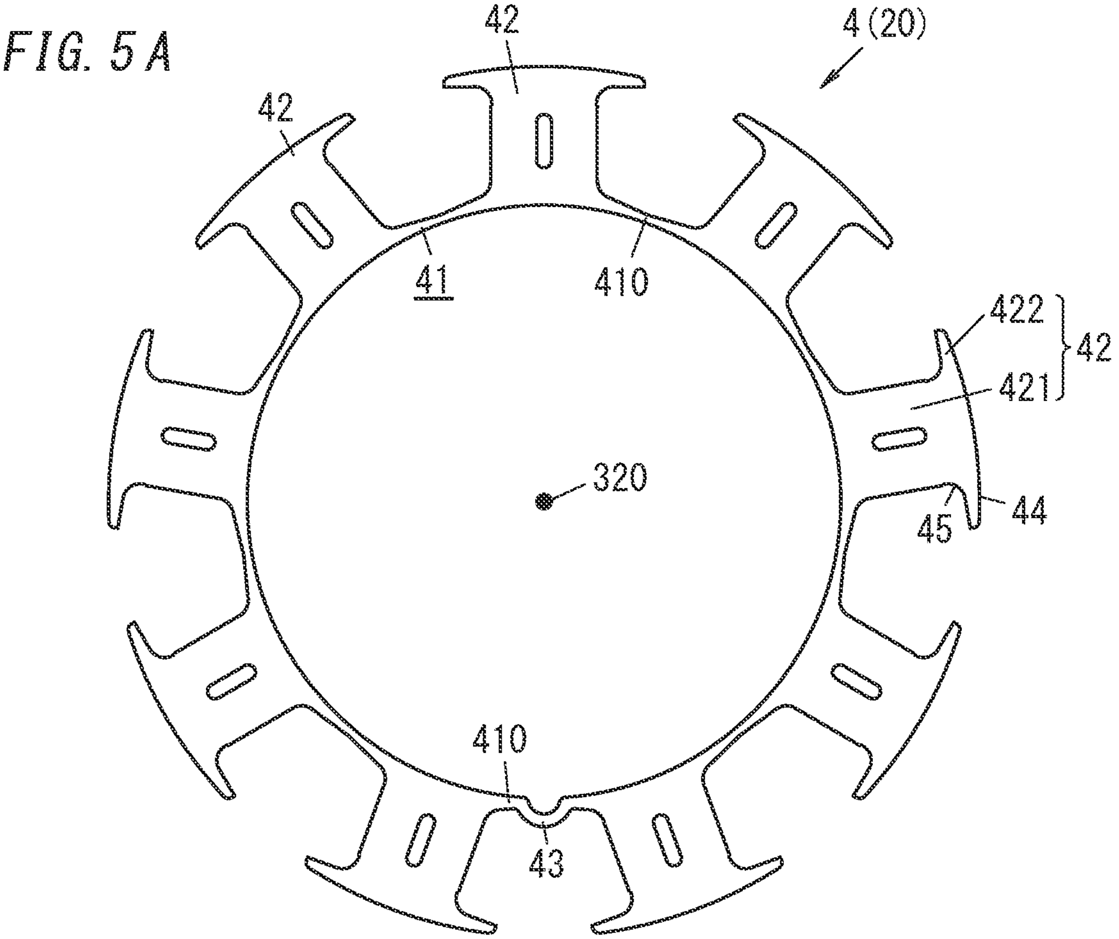
FIG. 5A is a front view of a teeth core of the motor as viewed from one end of the motor.

As shown in FIG. 5A, the inner cylindrical portion 41 has a circular cylindrical shape. The center axis of the inner cylindrical portion 41 agrees with the center axis 320 of the output shaft 32 (refer to FIGS. 3 and 4). The thickness direction defined for the plurality of steel sheets 40 also agrees with the center axis 320. The inner cylindrical portion 41 is continuous along its circumference. In other words, the inner cylindrical portion 41 is connected along its circumference without a break.

The body portion 421 of each of the plurality of teeth 42 has a rectangular parallelepiped shape. The body portion 421 protrudes outward from the inner cylindrical portion 41 along the radius of the inner cylindrical portion 41. The respective body portions 421 of the plurality of teeth 42 are arranged at regular intervals along the circumference of the inner cylindrical portion 41.

The two tip pieces 422 extend from a tip part of the body portion 421 in a direction intersecting with the direction in which the body portion 421 protrudes. More specifically, the two tip pieces 422 are provided on both sides along the circumference of the inner cylindrical portion 41 at the tip part of the body portion 421. The two tip pieces 422 extend along the circumference of the inner cylindrical portion 41.

The surface, located closer to the outer edge along the radius of the inner cylindrical portion 41, of each tip piece 422 includes a curvilinear surface 44. When viewed along the center axis 320, the curvilinear surface 44 has the shape of an arc along a circle which is concentric with the inner cylindrical portion 41.

Each tip piece 422 has a curved portion 45 as a part connected to the body portion 421. The curved portion 45 is curved such that as the distance to the outer edge of the tip piece 422 decreases along the radius of the inner cylindrical portion 41, the distance from the body portion 421 increases along the circumference of the inner cylindrical portion 41. That is to say, the curved portion 45, which is a part, located at the proximal end (i.e., closer to the body portion 421), of each tip piece 422, is chamfered to have a rounded shape.

The inner cylindrical portion 41 includes a plurality of (e.g., nine in this embodiment) coupling portions 410, each of which is a portion that couples two adjacent body portions 421 together. Each of the coupling portions 410 is formed in the shape of an arc when viewed along the center axis 320.

The inner cylindrical portion 41 includes an elastically deformable portion 43 as an integral part thereof. The elastically deformable portion 43 will be described in detail later in the "(3) Characteristic configuration of motor" section.

Figure 7:
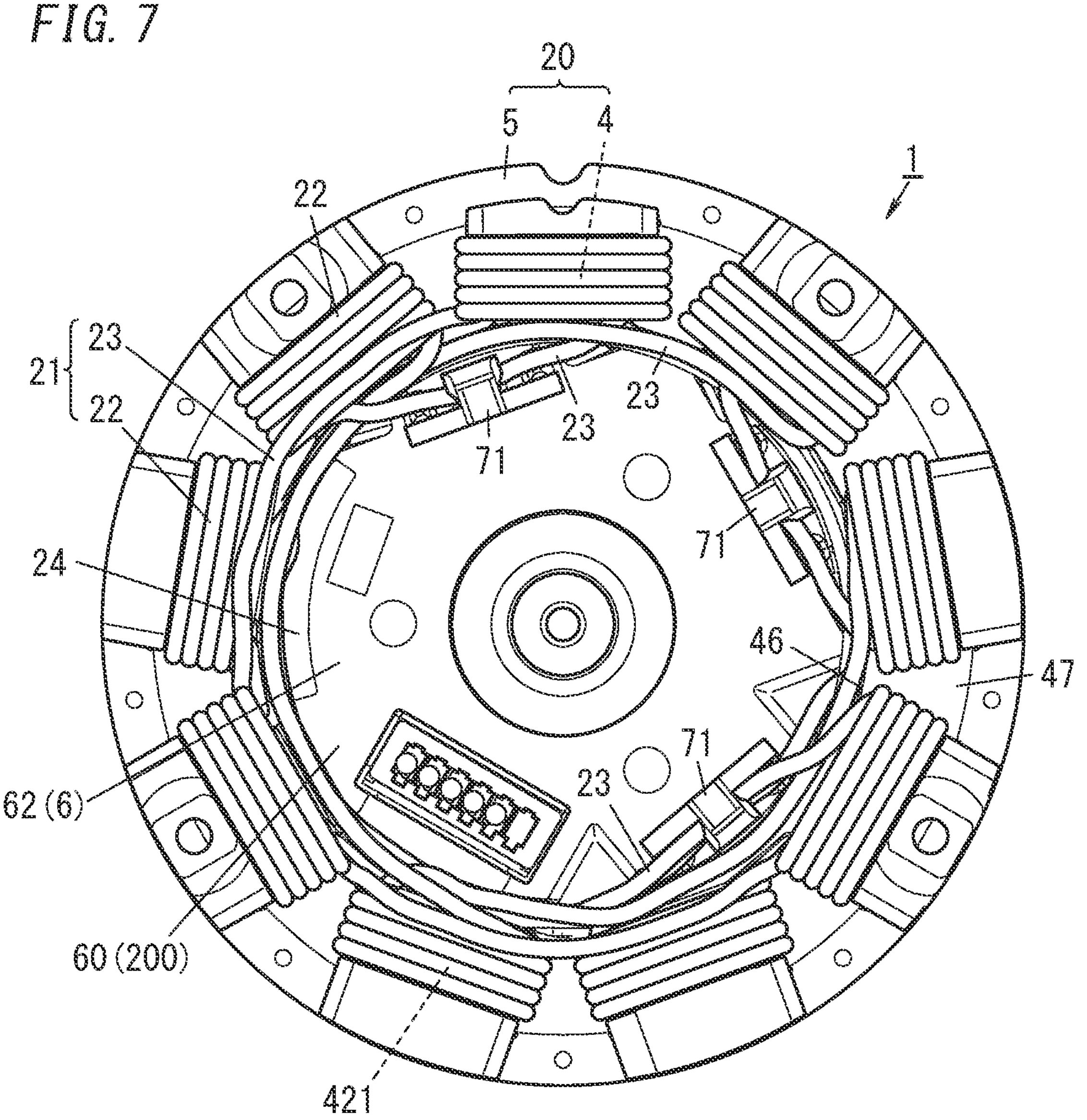
FIG. 7 is a rear view of the motor (except its circuit board and base) as viewed from the other end of the motor.

As shown in FIGS. 3 and 7, the stator wiring 21 includes coil wires 22 wound around the body portions 421 and transition wiring 23 that electrically connects together the coil wires 22 wound around the plurality of body portions 421.

As shown in FIG. 1, nine coil wires 22 are provided one to one for the nine teeth 42. The electric wire (winding) serving as each coil wire 22 and the transition wiring 23 may be an enamel wire, for example. This winding includes a linear conductor and an insulating coating that covers the conductor. The stator wiring 21 is configured as a single electric wire.

The stator core 20 further includes an insulator 6 that covers the teeth core 4. The insulator 6 may be made of a synthetic resin, for example. The insulator 6 has electrical insulation properties. The insulator 6 covers the plurality of teeth 42 at least partially.

As shown in FIGS. 3 and 4, the insulator 6 is made up of two members, namely, a first insulator 61 and a second insulator 62. The first insulator 61 and the second insulator 62 are arranged side by side along the center axis 320. The first insulator 61 and the second insulator 62 are formed in such a shape that allows the plurality of teeth 42 to be fitted thereto along the center axis 320. Specifically, the first insulator 61 is attached to the teeth core 4 to cover the plurality of teeth 42 from one end along the center axis 320 (i.e., the left side in FIG. 3 and hereinafter simply referred to as the "left side"). The second insulator 62 covers the plurality of teeth 42 from the other end of the center axis 320 (i.e., the right side in FIG. 3 and hereinafter simply referred to as the "right side"). Each of the first insulator 61 and the second insulator 62 includes: a cylindrical body 63 to overlap with the inner cylindrical portion 41 when viewed along the center axis 320; and a plurality of (e.g., nine in the example illustrated in FIG. 6) tooth covering portions 64 to cover the plurality of teeth 42. The cylindrical body 63 is formed in the shape of a circular cylinder, which is concentric with the inner cylindrical portion 41. The center axis of the cylindrical body 63 is aligned with the center axis 320 of the output shaft 32. Each tooth covering portion 64 protrudes outward from the cylindrical body 63 along the radius of the cylindrical body 63.

Figure 6:
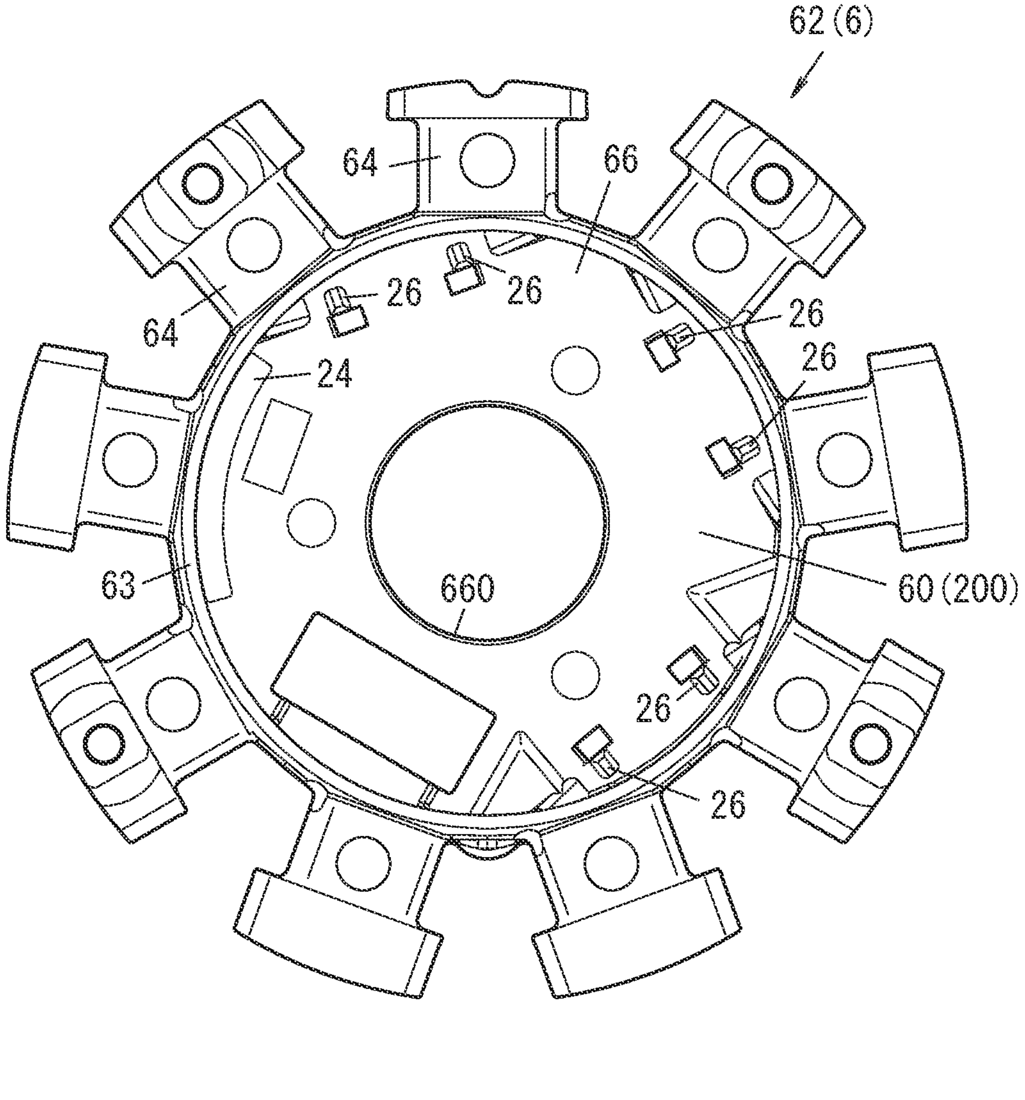
FIG. 6 is a rear view of a second insulator of the motor as viewed from the other end of the motor.

As shown in FIG. 6, the second insulator 62 includes a plate portion 66 inside the cylindrical body 63. The plate portion 66 has a center hole 660, to which an outer ring of a second bearing 34 (to be described later) (refer to FIG. 3) is fitted. The surface 60 of the plate portion 66 has guide supporting portions 26. The guide supporting portions 26 will be described in detail later in the "(3) Characteristic configuration of motor" section.

As shown in FIG. 3, in a state where the first insulator 61 and the second insulator 62 are attached to the teeth core 4 to cover the plurality of teeth 42 at least partially, each coil wire 22 is wound around a corresponding body portion 421 via the insulator 6 formed by the first insulator 61 and the second insulator 62. In this case, the coil wire 22 is wound around the body portion 421 so as to pass through a slot (cavity) between the body portion 421 and each of two body portions 421 adjacent to the former body portion 421.

In the state where the first insulator 61 and the second insulator 62 are attached to the teeth core 4, the tip, opposite from the inner cylindrical portion 41, of each tooth 42 is not covered with the insulator 6 but is in contact with the yoke core 5.

Each tooth covering portion 64 of the first insulator 61 extends from the left part of the cylindrical body 63 of the first insulator 61 to the right. On the other hand, each tooth covering portion 64 of the second insulator 62 extends from the right part of the cylindrical body 63 of the second insulator 62 to the left but does not reach a corresponding tooth covering portion 64 of the first insulator 61. That is to say, each tooth covering portion 64 of the first insulator 61 and a corresponding tooth covering portion 64 of the second insulator 62 are out of contact with each other but leave a gap 65 between themselves, where the tooth 42 is exposed. However, the coil wire 22 is wound around each tooth 42 to extend in the direction in which the tooth covering portion 64 of the first insulator 61 and the tooth covering portion 64 of the second insulator 62 face each other to go over the gap 65, and therefore, is out of contact with the tooth 42.

If the number of the steel sheets 40 that form the teeth core 4 is changed to modify the design of the motor 1, for example, the thickness of the teeth core 4 changes. Then, as the thickness of the teeth core 4 changes, the gap distance between the first insulator 61 and the second insulator 62 also changes. Naturally, the first insulator 61 and the second insulator 62 may also be designed to allow the respective tooth covering portions 64 of the first insulator 61 and the second insulator 62 to be in contact with each other and thereby leave no gap between their tooth covering portions 64.

As shown in FIGS. 3 and 4, the yoke core 5 includes a plurality of steel sheets 50. In other words, the yoke core 5 is formed by stacking the plurality of steel sheets 50 one on top of another in the thickness direction. Each steel sheet 50 is made of a magnetic material. Each steel sheet 50 may be a silicon steel sheet, for example.

As shown in FIG. 1, the yoke core 5 has a circular cylindrical shape. The center axis of the yoke core 5 agrees with the center axis 320 of the output shaft 32. The yoke core 5 is mounted on, and surrounds, the plurality of teeth 42.

The yoke core 5 includes a plurality of (e.g., nine) fitting portions 51. In other words, the yoke core 5 includes as many fitting portions 51 as the teeth 42. Each of the plurality of fitting portions 51 is a recess provided on the inner peripheral surface of the yoke core 5. The plurality of fitting portions 51 correspond one to one to the plurality of teeth 42. Each of the plurality of fitting portions 51 and one tooth 42, corresponding to the fitting portion 51, out of the plurality of teeth 42 are fitted into each other by causing at least one of the fitting portion 51 or the tooth 42 to move along the radius of the inner cylindrical portion 41. This allows the yoke core 5 to be mounted onto the plurality of teeth 42.

To each fitting portion 51, a portion, including the two tip pieces 422, of a corresponding tooth 42 is fitted. Thus, the length, measured along the circumference of the yoke core 5, of each fitting portion 51 is equal to the length as measured from the protruding tip of one of the two tip pieces 422 protruding from the body portion 421 through the protruding tip of the other tip piece 422. Note that as used herein, if some value is "equal to" another, these two values do not have to be exactly equal to each other but may also be different from each other within a tolerance range. The tolerance range may be herein defined by an error of within 3%, within 5%, or within 10%, for example.

With the insulator 6 attached onto the teeth core 4 and the coil wires 22 wound around the teeth core 4, the yoke core 5 may be mounted onto the plurality of teeth 42 by shrink-fitting, for example. Specifically, with the yoke core 5 heated and expanded radially, the teeth core 4 is put inside the yoke core 5. This makes the inner surface of the yoke core 5 face the respective tips of the plurality of teeth 42 along the radius of the inner cylindrical portion 41 with a narrow gap left between the inner surface of the yoke core 5 and the plurality of teeth 42. Thereafter, as the temperature of the yoke core 5 falls to cause the yoke core 5 to shrink, the inner surface of the yoke core 5 comes into contact with the respective tips of the plurality of teeth 42. That is to say, when the plurality of fitting portions 51 move inward along the radius of the yoke core 5 as the yoke core 5 shrinks, the plurality of fitting portions 51 are fitted onto the plurality of teeth 42. The yoke core 5 applies, to the plurality of teeth 42, contact pressure produced inward along the radius of the yoke core 5.

As shown in FIGS. 3 and 4, the stator 2 includes a circuit board 7. The circuit board 7 supplies a current to the stator wiring 21. The circuit board 7 includes electrical components mounted thereon and motor terminals 71, which are electrically connected to the electrical components and to which the transition wiring 23 is electrically connected. As shown in FIG. 3, the motor terminals 71 are provided at respective areas of the surface 200 of the stator core 20, on which the transition wiring 23 is disposed, to protrude from a peripheral portion thereof. In this embodiment, the motor terminals 71 are arranged to protrude from the surface 60 of the second insulator 62. Three motor terminals 71 are provided and respectively correspond to U-, V-, and W-phases of the three-phase AC system.

Figure 8:
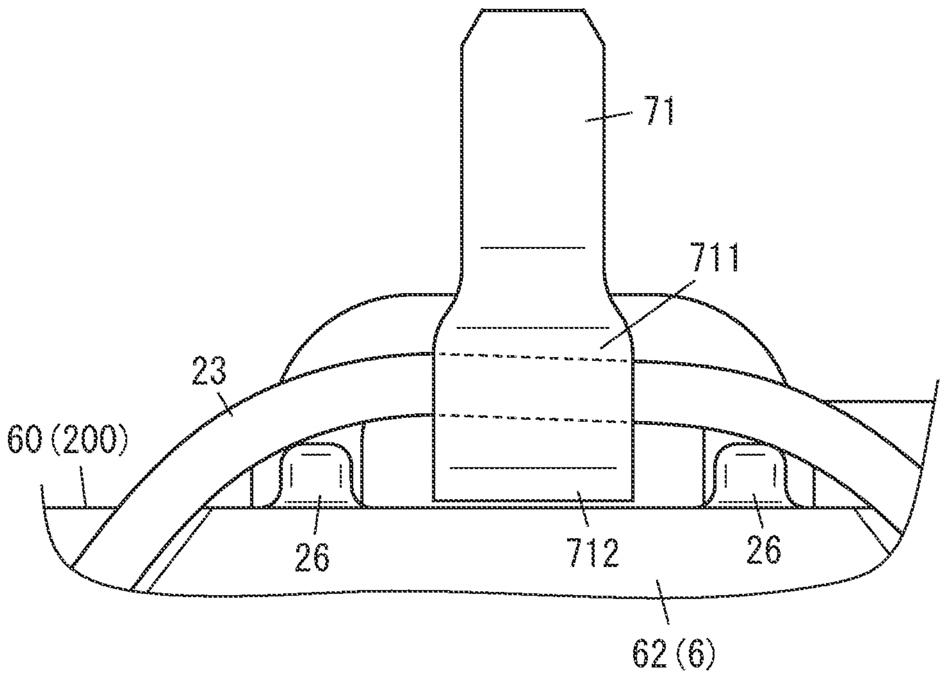
FIG. 8 is a side view of a motor terminal and surrounding part of the motor as viewed in a direction perpendicular to the center axis of the motor.
Figure 9:
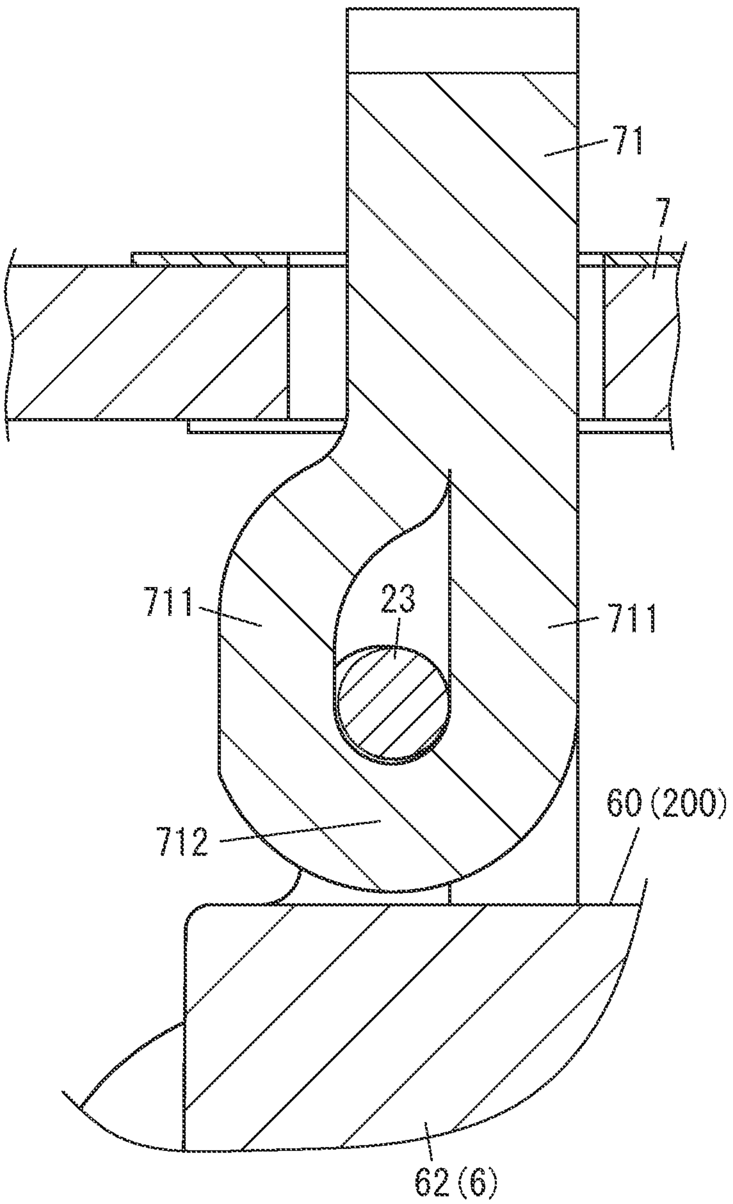
FIG. 9 is a cross-sectional view of the motor terminal and surrounding part as taken along a plane perpendicular to a direction in which transition wiring extends.

As shown in FIGS. 8 and 9, each motor terminal 71 includes a pair of clamping pieces 711. The transition wiring 23 is located between, and bonded to, the two clamping pieces 711.

As shown in FIGS. 3 and 4, another board 72 is provided, separately from the circuit board 7, on the other surface, opposite from the surface 60, of the second insulator 62.

Next, the configuration of the rotor 3 will be described in detail. As shown in FIG. 3, the rotor core 30 of the rotor 3 includes a plurality of steel sheets 301. The rotor core 30 is formed by stacking a plurality of steel sheets 301 one on top of another in the thickness direction. Each steel sheet 301 is made of a magnetic material. Each steel sheet 301 may be a silicon steel sheet, for example.

The rotor core 30 is formed in the shape of a circular cylinder, which is concentric with the inner cylindrical portion 41 of the stator core 20. The center axis of the rotor core 30 agrees with the center axis 320 of the output shaft 32. Along the center axis 320, both ends of the rotor core 30 are substantially aligned with both ends of the stator core 20. In this case, both ends of the rotor core 30 and both ends of the stator core 20 do not have to be exactly aligned with each other but may be misaligned with each other within a tolerance range. The tolerance range may be herein defined by an error of within 3%, within 5%, or within 10%, for example, of the thickness of the rotor core 30.

Inside the rotor core 30, the output shaft 32 is held. The rotor core 30 includes a plurality of (e.g., six in the example illustrated in FIG. 1) magnet housings 302. The plurality of magnet housings 302 house the plurality of permanent magnets 31. Each of the plurality of magnet housings 302 is a through hole that penetrates through the rotor core 30 along the center axis 320. Each of the plurality of permanent magnets 31 is held in a corresponding one of the magnet housings 302 by being inserted into the corresponding magnet housing 302 with an adhesive applied. Alternatively, each of the plurality of permanent magnets 31 may also be held in its corresponding magnet housing 302 with magnetic suction force between the rotor core 30 and the permanent magnet 31, instead of using the adhesive.

The plurality of magnet housings 302 are arranged at regular intervals along the circumference of the rotor core 30. This allows the plurality of permanent magnets 31 to be arranged at regular intervals along the circumference of the rotor core 30. In addition, the longitudinal axis of each of the plurality of permanent magnets 31 is aligned with the circumference of the rotor core 30. Each permanent magnet 31 may be, for example, a neodymium magnet.

As shown in FIG. 3, the motor 1 further includes a base 35, a first bearing 33, and a second bearing 34. The base 35 is attached to the rotor core 30 to rotate integrally with the rotor core 30, the output shaft 32 and an inner ring of the first bearing 33. The first bearing 33 is disposed on the left of the rotor core 30 and has its inner ring attached to a left part of the output shaft 32. The second bearing 34 is disposed on the right of the rotor core 30 and has its inner ring attached to a right part of the output shaft 32 to rotate integrally with the output shaft 32. An outer ring of the second bearing 34 is attached to the second insulator 62.

During the manufacturing process of the motor 1, the coil wires 22 are wound around the respective body portions 421 of the plurality of teeth 42 of the teeth core 4 via the insulator 6 with the teeth core 4 of the stator 2 and the yoke core 5 separated from each other as shown in FIG. 1. Thereafter, the yoke core 5 is mounted onto the plurality of teeth 42.

The coil wires 22 are wound around the teeth 42 using, for example, an instrument disposed beside the tip of each tooth 42. Since the plurality of teeth 42 protrude radially outward from the inner cylindrical portion 41, the space around the tip of each tooth 42 may be broader than in a situation where the plurality of teeth 42 protrude inward. This makes it easier to wind the coil wire 22 around each tooth 42 and may even increase the space factor of the coil wire 22 as the case may be.

In addition, each tooth 42 includes the two tip pieces 422 serving as a stopper for reducing the chances of the coil wire 22 coming off the body portion 421, thus making it even easier to wind the coil wire 22 around each tooth 42. Furthermore, this allows the stress applied to each tooth 42 to be distributed to the two tip pieces 422, thus reducing the chances of the tooth 42 being deformed. Besides, each tip piece 422 has the curvilinear surface 44, which is in contact with the yoke core 5. This makes it easier to distribute, along the curvilinear surface 44, the stress applied from the yoke core 5 to each tooth 42 while the yoke core 5 is mounted onto the plurality of teeth 42 than in a situation where the surface of the tip piece 422 is a flat surface.

Furthermore, before the transition wiring 23 is connected to the motor terminals 71, a gap is left between the two clamping pieces 711 (refer to FIG. 9) to be opened toward a direction pointing away from the surface 60 of the second insulator 62. The transition wiring 23 is inserted through this gap. With the transition wiring 23 inserted into the gap between the two clamping pieces 711, the clamping pieces 711 are caulked to close the gap. In this manner, the transition wiring 23 is electrically connected to the motor terminals 71.

(3) Characteristic Configuration of Motor (3.1) Elastically Deformable Portion

Figure 5B:
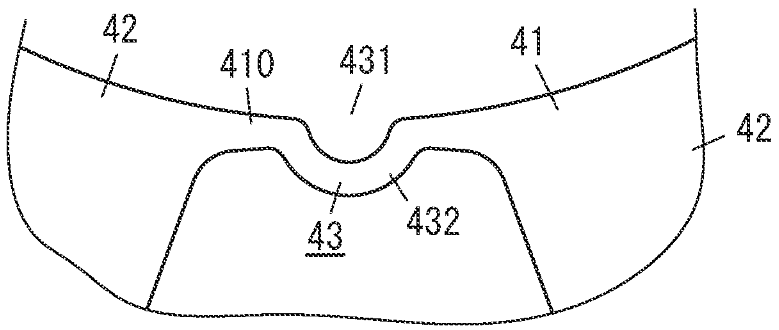
FIG. 5B illustrates, on a larger scale, a main part of the teeth core shown in FIG. 5A.

As shown in FIG. 5B, the elastically deformable portion 43 is formed as a part of the inner cylindrical portion 41 of the teeth core 4. The elastically deformable portion 43 has a lower degree of rigidity, and is elastically deformable more easily, than the rest of the inner cylindrical portion 41. As described above, during the manufacturing process of the motor 1, the teeth core 4 is fitted by, for example, shrink fitting, into the yoke core 5, which applies inward contact pressure to the plurality of teeth 42 along the radius of the yoke core 5. In addition, each of the teeth 42 also receives tension from the transition wiring 23. Due to these factors, the inner cylindrical portion 41 of the teeth core 4 receives circumferential force and is easily subjected to circumferential compressive force, among other things.

If the inner cylindrical portion 41 had no such portion that is elastically deformable more easily than the rest of the inner cylindrical portion 41, subjecting the inner cylindrical portion 41 of the teeth core 4 to the circumferential compressive force would cause significant deformation such as buckling somewhere in the inner cylindrical portion 41. It is impossible to predict which part of the inner cylindrical portion 41 would be deformed so significantly. In addition, such significant deformation would cause so significant a decrease in the degree of circularity of the inner cylindrical portion 41 that the magnetic field that should be generated by the stator core 20 would fail to be generated to have a negative impact on the output of the motor 1. Thus, to avoid such a situation, according to this embodiment, the elastically deformable portion 43 is provided as a part of the inner cylindrical portion 41 of the teeth core 4.

The elastically deformable portion 43 has a smaller modulus of elasticity (elastic modulus) as measured along the circumference of the inner cylindrical portion 41 than the rest of the inner cylindrical portion 41. The modulus of elasticity follows the so-called Hooke's law.

Providing such an elastically deformable portion 43 makes it easier to control the deformation of the inner cylindrical portion 41. This is because with the elastically deformable portion 43 provided, subjecting the inner cylindrical portion 41 of the teeth core 4 to circumferential force would make the deformation of the inner cylindrical portion 41 concentrated mostly toward the elastically deformable portion 43. This makes it easier to avoid causing a significant decrease in the degree of circularity of the inner cylindrical portion 41 even when the inner cylindrical portion 41 is subjected to the circumferential force.

In addition, in this embodiment, the elastically deformable portion 43 is formed in one of the coupling portions 410. In the inner cylindrical portion 41, each coupling portion 410 has a smaller modulus of elasticity as measured in the circumferential direction than any portion with the tooth 42. Thus, forming the elastically deformable portion 43 in one of the coupling portions 410 makes it easier to provide the inner cylindrical portion 41 with the elastically deformable portion 43.

Furthermore, in this embodiment, the elastically deformable portion 43 is provided at only one spot of the inner cylindrical portion 41. Alternatively, the elastically deformable portions 43 may also be provided at two or more spots of the inner cylindrical portion 41. However, providing the elastically deformable portions 43 at two or more spots of the inner cylindrical portion 41 makes it impossible to predict which of the two or more elastically deformable portions 43 will be deformed more significantly when the inner cylindrical portion 41 is subjected to the circumferential force. In addition, this also makes it more difficult to control the deformation of the inner cylindrical portion 41 than in a situation where the elastically deformable portion 43 is provided at only one spot of the inner cylindrical portion 41. For these reasons, the elastically deformable portion 43 may be provided at one spot, or two or more spots, of the inner cylindrical portion 41. Nevertheless, it is preferable that the elastically deformable portion 43 be provided at only spot of the inner cylindrical portion 41. Thus, according to this embodiment, providing the elastically deformable portion 43 at only one spot of the inner cylindrical portion 41 makes it easier to control the deformation of the inner cylindrical portion 41 when the inner cylindrical portion 41 is subjected to the circumferential force.

In addition, according to this embodiment, the elastically deformable portion 43 has a groove 431 that extends along the axis of the inner cylindrical portion 41 (i.e., along the center axis 320). This allows the groove 431 to provide, when the inner cylindrical portion 41 is subjected to the circumferential compressive force, a shrinkage allowance along the circumference of the inner cylindrical portion 41, thus making it even easier to control the deformation (i.e., circumferential shrinkage) of the inner cylindrical portion 41.

Furthermore, according to this embodiment, a groove wall portion 432 that forms the groove 431 is curved. This allows the groove wall portion 432 to provide, when the inner cylindrical portion 41 is subjected to the circumferential tensile force, an expansion allowance along the circumference of the inner cylindrical portion 41, thus making it even easier to control the deformation (i.e., circumferential expansion) of the inner cylindrical portion 41.

(3.2) Position of Transition Wiring

As shown in FIG. 7, the transition wiring 23 is located in a region 46 which is radially inside the body portions 421. As described above, the teeth core 4 includes the plurality of teeth 42 that protrudes outward from the inner cylindrical portion 41 along the radius of the inner cylindrical portion 41. The single wire of the stator wiring 21 is wound around the body portion 421 of one tooth 42 to form a part of the coil wiring 22. Next, the single wire of the stator wiring 21 is extended toward an adjacent tooth 42 to form part of the transition wiring 23. Then, the single wire of the stator wiring 21 is wound around the body portion 421 of the adjacent tooth 42 to form another part of the coil wiring 22. This series of winding work will be repeated a number of times until the stator wiring 21 is wound around every one of the teeth 42. This work may be performed more easily according to the configuration of this embodiment because the teeth core 4 includes a plurality of teeth 42 protruding outward from the inner cylindrical portion 41 along the radius of the inner cylindrical portion 41. That is to say, letting the teeth protrude inward along the radius of the yoke core 5 would make it difficult to leave a broad space around the respective tips of the teeth, thus making it difficult to perform the work of winding the stator wiring around the teeth. Thus, a configuration in which the teeth 42 protrude outward from the inner cylindrical portion 41 along the radius of the inner cylindrical portion 41 is adopted according to this embodiment, thus making the respective tips of the teeth open and making it easier to leave a broad space around the tips of the teeth. Consequently, the work of winding the stator wiring 21 around the teeth 42 may be performed more smoothly.

In addition, the transition wiring 23 is located in the region 46 that is located radially inside the body portions 421. This shortens the length of the transition wiring 23 (i.e., the length of the stator wiring 21), thus cutting down the wiring used and reducing the Joule loss, compared to a situation where the transition wiring 23 is provided in a region 47 that is located radially outside the body portions 421.

In addition, this configuration may also reduce, when the teeth core 4 is fitted into the yoke core 5, the chances of the transition wiring 23 being jammed between the yoke core 5 and the teeth core 4, compared to the arrangement in which transition wiring 23 is arranged in the region 47 that is located radially outside the body portions 421.

As shown in FIG. 6, the second insulator 62 includes a holding portion 24 for holding the transition wiring 23 at an intended position. The holding portion 24 is provided to extend along a part of the circumference of the cylindrical body 63 and to protrude from the plate portion 66 along the cylindrical body 63. As shown in FIG. 7, the transition wiring 23 is held by the outer peripheral surface of the holding portion 24, thus regulating the radially inward movement of the transition wiring 23. As a result, the transition wiring 23 may be held at the intended position, thus reducing the chances of allowing the transition wiring 23 to move and thereby produce tension to the transition wiring 23 or causing a decrease in the degree of circularity of the inner cylindrical portion 41.

In addition, as shown in FIG. 3, a side circumferential surface 25 of the plate portion 66 of the second insulator 62 may also serve as a holding portion for holding the transition wiring 23 at the intended position.

(3.3) Guide Supporting Portions

As shown in FIGS. 6 and 8, guide supporting portions 26 are provided around the motor terminals 71 to protrude from the surface 200 of the stator core 20 (i.e., the surface 60 of the second insulator 62).

As described above, the transition wiring 23 is clamped between the pair of clamping pieces 711 of each of the motor terminals 71. After passing through each motor terminal 71, the transition wiring 23 is extended toward the side circumferential surface 25 (refer to FIG. 3) of the second insulator 62. At this time, the transition wiring 23 could come into contact with, and is scratched by, an edge of the bottom plate 712 of the motor terminal 71 as shown in FIGS. 8 and 9. To avoid such a situation, the guide supporting portions 26 are provided according to this embodiment. The guide supporting portions 26 support the transition wiring 23, which is electrically connected to the motor terminals 71, to make the transition wiring 23 out of contact with the surface 200 of the stator core 20. This reduces the chances of the transition wiring 23 coming into contact with, and getting scratched by, the edge of the bottom plate 712 of the motor terminals 71.

In addition, in this embodiment, the guide supporting portions 26 are provided on both sides of each motor terminal 71 in the peripheral portion of the surface 200 of the stator core 20 to interpose the motor terminal 71 between themselves. This further reduces the chances of the transition wiring 23 coming into contact with, and getting scratched by, both edges of the bottom plate 712 of the motor terminal 71. Alternatively, the guide supporting portion 26 may also be provided on only one side of each motor terminal 71 in the peripheral portion of the surface 200 of the stator core 20.

Furthermore, in this embodiment, the guide supporting portions 26 are formed on the surface 60 of the insulator 6. This makes it easier to form the guide supporting portions 26 because the guide supporting portions 26 are provided on the surface 60 of the insulator 6, which may be made of a synthetic resin.

(4) Variations

Next, variations of the exemplary embodiment will be enumerated one after another. Note that the variations to be described below may be adopted in combination as appropriate.

The configuration of the rotor 3 may be changed arbitrarily. For example, the plurality of permanent magnets 31 do not have to be arranged to form a polygonal pattern but may also be arranged as spokes.

The number of the permanent magnets 31 provided does not have to be six but may also be two or more.

The rotor 3 may include electromagnets instead of the permanent magnets 31.

When viewed along the center axis 320 of the rotor core 30, the rotor core 30 does not have to have a perfectly circular shape. Alternatively, the rotor core 30 may also have a generally circular or elliptical shape with some projections or recesses provided along its circumference.

The motor 1 does not have to be provided for the electric tool 10. Alternatively, the motor 1 may also be provided for an electric bicycle or an electric assist bicycle, for example.

Optionally, the motor 1 may further include a weight adjuster attached to the rotor 3. The weight adjuster may be configured as, for example, a cylindrical weight and may be attached to the output shaft 32 of the rotor 3. The weight balance of the rotor 3 may be adjusted by partially cutting off the weight adjuster and thereby changing the weight and center of gravity of the weight adjuster. Still alternatively, the weight balance of the rotor 3 may also be adjusted by partially cutting off the rotor core 30 itself. Yet alternatively, the weight balance of the rotor 3 may also be adjusted by adjusting the positions and amount of the adhesive applied to the rotor 3.

Furthermore, each of the plurality of steel sheets 40 and the plurality of steel sheets 301 is preferably a single member, of which the respective parts are connected together. This reduces the number of parts of the motor 1, compared to a situation where each steel sheet 40 (or 600) is made up of a plurality of members.

The stator wiring 21 does not have to be a single electric wire but may also be made up of a plurality of electric wires.

(5) Recapitulation

As can be seen from the foregoing description of an exemplary embodiment and its variations, a motor (1) according to a first aspect includes: a stator (2) including a stator core (20) and stator wiring (21); and a rotor (3) including magnets and rotating with respect to the stator core (20). The stator core (20) includes a teeth core (4) and a yoke core (5). The teeth core (4) includes: an inner cylindrical portion (41) which has a cylindrical shape and in which the rotor (3) is disposed; and a plurality of teeth (42), each of which includes a body portion (421) protruding outward from the inner cylindrical portion (41) along a radius of the inner cylindrical portion (41). The yoke core (5) has a cylindrical shape and is mounted onto the plurality of teeth (42) to surround the plurality of teeth (42). The stator wiring (21) includes: a coil wire (22) wound around the body portion (421); and transition wiring (23) electrically connecting together a plurality of the coil wires (22) respectively wound around a plurality of the body portions (421). The transition wiring (23) is provided in a region located inside the body portion (421) along a radius of the body portion (421).

The first aspect shortens the length of the transition wiring (23), thus cutting down the wiring used and reducing the Joule loss, compared to a situation where the transition wiring (23) is provided in a region (47) located radially outside the body portions (421).

A second aspect may be implemented in conjunction with the first aspect. In the second aspect, the stator core (20) further includes an insulator (6) covering the teeth core (4). The insulator (6) includes a holding portion (24) to hold the transition wiring (23) at an intended position.

The second aspect allows the transition wiring (23) to be held at an intended position, thus reducing the chances of the transition wiring (23) moving to produce tension to the transition wiring (23) and/or causing a decrease in the degree of circularity of the inner cylindrical portion (41).

Note that the constituent elements according to the second aspect are not essential constituent elements for the motor (1) but may be omitted as appropriate.

A third aspect may be implemented in conjunction with the first or second aspect. An electric tool (10) according to the third aspect includes the motor (1) according to the first or second aspect.

The third aspect shortens the length of the transition wiring (23) of the motor (1) included in the electric tool (10), thus making it easier to cut down the wiring used and reduce the Joule loss.

REFERENCE SIGNS LIST

1 Motor
10 Electric Tool
2 Stator

20 Stator Core
21 Stator Wiring
22 Coil Wire
23 Transition Wiring
24 Holding Portion
25 Side Circumferential Surface
3 Rotor
31 Permanent Magnet
4 Teeth Core
41 Inner Cylindrical Portion
42 Tooth
421 Body Portion
5 Yoke Core
6 Insulator

The invention claimed is:

1. A motor comprising:

a stator including a stator core and stator wiring;

a rotor including magnets and configured to rotate with respect to the stator core; and an insulator, wherein the stator core includes:

a teeth core including: an inner cylindrical portion having a cylindrical shape, the rotor being disposed inside the inner cylindrical portion; and a plurality of teeth, each of the plurality of teeth including a body portion protruding outward from the inner cylindrical portion along a radius of the inner cylindrical portion; and a yoke core having a cylindrical shape and mounted onto the plurality of teeth to surround the plurality of teeth, the stator wiring includes:

a plurality of coil wires respectively wound around body portions of the plurality of teeth; and transition wiring electrically connecting together the plurality of coil wires, the transition wiring is provided in a region located inside the body portion along a radius of the body portion, the inner cylindrical portion includes a plurality of coupling portions, each of which is a portion that couples body portions of adjacent two teeth of the plurality of teeth together, at least one of the plurality of coupling portions includes an elastically deformable portion having a groove extending along an axis of the inner cylindrical portion, the groove provides, when the inner cylindrical portion is subjected to a circumferential compressive force, a shrinkage allowance along a circumference of the inner cylindrical portion, the insulator covers the teeth core, the insulator includes:

a cylindrical body formed in a shape of a circular cylinder, which is concentric with the inner cylindrical portion;

a plate portion inside the cylindrical body; and a holding portion regulating a radially inward movement of the transition wiring, and the holding portion is provided to extend along a part of a circumference of the cylindrical body and to protrude from the plate portion along the cylindrical body.

2. An electric tool comprising a power supply; and the motor of claim 1.

* * * * *